United States Patent Office 3,266,569
Patented August 16, 1966

3,266,569
RECOVERY OF VISCOUS UNSATURATED CRUDE BY INTERMITTENT GAS INJECTION
Eugene L. Sterrett, Findlay, Ohio, assignor to Marathon Oil Company, Findlay, Ohio, a corporation of Ohio
No Drawing. Filed Sept. 14, 1962, Ser. No. 223,824
4 Claims. (Cl. 166—2)

My invention relates to the recovery of oil from subterranean reservoirs. More particularly the invention relates to a process wherein a solvent is injected into a formation through a portion of the wells in a multiwell system while petroleum fluids are recovered at other wells in the system, stopping both injection and recovery for a period of time, and reversing the initial step by injecting solvent into the formation through the wells previously used for recovery while recovering petroleum fluid solutions from the formation through wells previously used for solvent injection.

Various solvents, both liquid and gaseous, have been used to modify the viscosity of petroleum crudes. Examples of such solvents include high sulfur content petroleum fractions, carbon dioxide, hydrogen sulfide, sulfur dioxide, methane, ethane, propane, butane, and mixtures of hydrocarbons such as methane and pentane. Heat, via steam and heated gases, has also been used for this purpose.

Various methods have been used to advantage in recovering viscous crudes. Thus, a procedure has been suggested wherein a solvent is injected into a formation to form channels from the injection wells to the recovery wells through which steam can be forced to scavenge the oil in the formation. Another procedure which has been suggested is to inject a gas into a formation, allow the formation to remain quiescent for a period of time sufficient to allow substantial equilibrium to be established in the formation and then allow the pressurized crude to flow from the formation.

In still another procedure a fluid miscible with the petroleum in the reservoir is injected into the formation followed by a water drive. Other procedures are known to the art, but all except the first two described procedures are hampered by the formation of channels or fingers in the reservoir between the injection wells and the recovery wells. In the first mentioned process especially, miscible solvents are used for the purpose of forming channels; and in the second procedure, channeling is no problem as there is no recovery of petroleum fluids during the injection period.

I have now discovered a cyclic recovery process utilizing a plurality of wells equipped for both injection and petroleum recovery wherein:

(1) A gaseous solvent is injected into a subterranean formation via a portion of the wells drilled into the formation while petroleum fluid solutions are being recovered from a second portion of the wells drilled into the formation, (2) The injection and recovery steps are interrupted for a period of time sufficient to cause substantial mixing of the injected solvents and the petroleum in the formation, and (3) The procedure is reversed by recovering petroleum fluid solutions via the wells just previously utilized as injection wells while injecting solvent into the formation through wells just previously utilized to recover petroleum fluid solutions.

In an alternate procedure, a portion of the wells can be shut off and the formation surrounding them can be left in a quiescent state while injection and recovery operations are being carried out in other portions of the formation. The areas of quiescence, injection and recovery would be rotated to achieve optimum petroleum fluid recovery.

My process utilizing alternate periods or areas of quiescence and concurrent injection and recovery provides improved contact between the crude and the injected solvent, especially in areas of high flow rate, i.e., near the well bore, where channeling is the greatest problem. This result occurs because established channels disappear when the formation conditions are quiescent because of substantial displacement of the heavier fluids through the lighter solvent and the mixing which attends this displacement. Mixing is also enhanced when the pressure gradient is reversed in a gas treatment because the highly mobile gas bubbles trapped with the viscous crude expand as they flow toward the newly presented low pressure area, thereby providing more solvent action because of an increased solvent-crude interface. To optimize this effect and to minimize channeling, pressure is released very slowly at the start of the recovery cycle. Water recovery is also reduced by my process as the solvent apparently drives the water into areas of the formation remote to the well bore. The water channels are then destroyed as the crude mixes with the solvent by displacement.

The process is usually carried out by injecting into a formation from about 10 to about 25 percent, based on pore volume of the formation within a 100-foot radius of the well bore, of a solvent; allowing the formation containing the solvent to remain quiescent for at least about 2 to 4 hours; and applying back pressure on the injected area from a nearby well which is, in turn, being injected with solvent. This procedure is repeated until the formation is exhausted. Succeeding injections of solvent should be progressively larger as the treatment continues. The incremental increase is usually from about 1 to about 2 percent but can be larger or smaller as desired. This procedure is continued until the oil flows stabilize, quantitatively, usually after 6 or 7 cycles.

Solvents which are normally used in secondary petroleum recovery operations are useful in my invention. Other solvents such as tetrafluoromethane, trifluorochloromethane, perchloroethylene, and ethylene dichloride are also useful for this purpose. Of the above listed solvents, I prefer to utilize a hydrocarbon having 1–4 carbon atoms.

The following examples more fully illustrate my invention, however, it is not intended that my invention be limited to the exact procedure, solvents, or crudes discussed. Rather it is intended that all equivalents obvious to those skilled in the art be within the scope of my invention as claimed.

*Example I*

A formation having a bottom-hole pressure of 800 p.s.i., 116 md. permeability, and containing a 250 cp. crude is pressured with methane at the rate of about 30 M c.f.h. for 4 hours via a 4,000-foot central well of an inverted five-spot well pattern. The wells in the pattern are about 20 percent water cut. About 50 M c.f. of gas remains in the casing on completion of pressurization. After injection the 44.7 foot thick formation is allowed to remain dormant for 2 hours. Gas is bled from the casing at 20 M c.f.h. and pumping is initiated as soon as there is a fluid level. During this period, pumping is continued until the well is pumped off. During the period of bleedoff and pumping, injection is carried out in the remaining wells of the pattern. The injectivity of the area surrounding the individual wells should improve as the treatment cycle is continued until an injection rate of about 50 M c.f.h. is achieved, and the amount of methane required should stabilize at this level after about 5–10 cycles.

*Example II*

In a pattern of wells having a water cut greater than 50 percent and in a formation of the characteristics of the formation of Example I, gas is injected at 70 M c.f.h. for 3 hours. After the well has been shut in 2 hours, the gas is bled off at 30 M c.f.h. via the well casing. Pumping is initiated after about 90 M c.f. of gas is withdrawn. The well is produced until it is pumped off or until the water cut increases. The cycle is then repeated.

Now, having described my invention, what I claim is:

1. The process for the recovery of a viscous unsaturated crude from subterranean formations, having a plurality of wells drilled therein, said wells being equipped for injection and recovery operations comprising in combination:
   (a) Injecting gaseous hydrocarbon solvent, in a portion of said wells having 1-4 carbon atoms in the amount of from about 10% to about 25% formation pore volume, into a treatment zone immediately adjacent the well bore;
   (b) Allowing the treatment zone to remain essentially quiescent for from about 2 to about 4 hours while substantially maintaining the pressure within the treatment zone and thereafter;
   (c) Withdrawing a mixture of solvent and petroleum from another portion of wells and thereafter;
   (d) Reversing the flow by injecting a gaseous hydrocarbon solvent containing 1 to 4 carbon atoms into the portion of said wells that were previously production wells and recovering the mixture of solvent and petroleum through the portion of said wells previously used as injection wells with;
   (e) Repetition of steps (a)-(d) above with successive cycles.

2. The process of claim 1 in which the amount of gaseous hydrocarbon solvent is increased from about 1 to about 2% between successive cycles.

3. The process of claim 1 in which the injection well treatment penetrates up to a diameter of about 100 feet adjacent the well bore.

4. The process of claim 3 in which the amount of gaseous hydrocarbon solvent is increased from about 1 to about 2% between successive cycles.

References Cited by the Examiner

UNITED STATES PATENTS

| | | | |
|---|---|---|---|
| 1,067,868 | 7/1913 | Dunn | 166—9 X |
| 2,115,378 | 4/1938 | Wolf | 166—2 |
| 2,699,832 | 1/1955 | Allen | 166—44 |
| 2,885,002 | 5/1959 | Jenks | 166—9 |
| 2,968,350 | 1/1961 | Slobod et al. | 166—9 |
| 3,065,790 | 11/1962 | Holm | 166—9 |
| 3,123,134 | 3/1964 | Kyte et al. | 166—2 |

OTHER REFERENCES

The Condensed Chemical Dictionary, 6th edition, Reinhold Publishing Co., New York 1961, pages 466 and 865.

Uren: Petroleum Production Engineering (Exploitation), 2d edition, McGraw-Hill Book Co. Inc., N.Y., 1939, pp. 423-426.

CHARLES E. O'CONNELL, *Primary Examiner.*

G. H. GOLD, S. J. NOVOSAD, *Assistant Examiners.*